United States Patent [19]

Mohr et al.

[11] Patent Number: 4,460,478

[45] Date of Patent: Jul. 17, 1984

[54] ORTHOSILICATE ESTER CONTAINING HEAT TRANSFER FLUIDS

[75] Inventors: Paul H. Mohr, Chappaqua; Eugene A. Zientek, Thornwood, both of N.Y.

[73] Assignee: Union Carbide Corporation, Danbury, Conn.

[21] Appl. No.: 430,374

[22] Filed: Sep. 30, 1982

[51] Int. Cl.$^3$ .......................... C09K 5/00; F28F 23/00
[52] U.S. Cl. ...................................... 252/75; 252/76; 252/78.3
[58] Field of Search ........................... 252/75, 76, 78.3

[56] References Cited

U.S. PATENT DOCUMENTS

| | | | |
|---|---|---|---|
| 2,349,338 | 5/1944 | Clapsadle et al. | 252/75 |
| 2,467,177 | 4/1949 | Zimmer | 252/78.3 |
| 2,815,328 | 12/1957 | Green et al. | 252/75 |
| 3,198,820 | 8/1965 | Pines et al. | 260/448.2 |
| 3,630,917 | 12/1971 | McCord | 252/78.3 |
| 4,219,433 | 8/1980 | Manabe et al. | 252/76 |

*Primary Examiner*—John E. Kittle
*Assistant Examiner*—Robert A. Wax
*Attorney, Agent, or Firm*—Dale Lynn Carlson

[57] ABSTRACT

A novel composition concentrate comprising at least one glycol together with at least one orthosilicate ester having improved stability at a pH of between about 6.0 and about 8.0.

11 Claims, No Drawings

ORTHOSILICATE ESTER CONTAINING HEAT TRANSFER FLUIDS

FIELD OF THE INVENTION

This invention relates to a novel composition concentrate comprising at least one glycol together with at least one orthosilicate ester. The concentrate is diluted with water for use as a heat transfer fluid.

BACKGROUND OF THE INVENTION

Heat transfer fluids, such as those used as coolants in automobile radiator systems, commonly employ a heat transfer medium, such as aqueous alcohol, that is inhibited from attack on the metal of the cooling system by virtue of organic and/or inorganic inhibitors. The art has long recognized inorganic and organic silicates as useful in aqueous alcohol solution in inhibiting corrosive attack on coolant system metal, including iron, brass, copper, solder, aluminum, and the like.

Unfortunately, inorganic silicates tend to be unstable in alcohol when used in inhibitory effective amounts. Instability manifests itself by the formation of gels within the heat transfer fluid upon standing and aging. These gels pose both aesthetic and functional problems in the product in which the gels form. The aesthetic problem is due to a poor, lumpy product appearance when dispensed from its container during installation in the heat transfer system. The functional problem is two-fold: (1) some of the product, namely part of the silicate additive, adheres to the container walls during installation and is not, therefore, available for use in the heat transfer system and (2) the silicate itself is altered in form by the gelation from an active, low molecular form to a condensed, high molecular form having limited activity.

In view of this instability associated with gels, costly silicone additives have been used to stabilize inorganic silicates against gel formation in alcohol, as disclosed in U.S. Pat. No. 3,198,820. Silicone-stabilized inorganic silicates are effective in alcohol media in providing a stable, gel-free heat transfer fluid that will avoid excessive corrosive attack, particularly on certain cooling system metals such as iron, steel, aluminum, brass, copper and solder. These silicone-stabilized compositions are preferably utilized in a pH range of about 9 to 12.0.

Organic orthosilicate esters have also been recognized in the art as being useful corrosion inhibitors in aqueous alcohol heat transfer solutions. By way of illustration, U.S. Pat. No. 2,349,338 (Clapsadle) discloses a non-corrosive heat-transfer liquid comprising an aqueous solution of an alcohol and an inhibitor containing as the essential corrosion preventive for metals, including aluminum, the hydrolyzed product of a silicic acid ester of a member of the group consisting of monohydric and polyhydric alcohols, said liquid preferably having a pH of between about 9.0 and about 12.0. Such liquids are generally not marketed in the diluted aqueous form, however, but rather as an alcohol concentrate. When an attempt was made to store various concentrates of the above ethylene glycol-based preferred compositions of Clapsadle to test their storage (shelf) life, gelation (i.e. stability) problems were encountered. These gelation problems are a real obstacle to a successful commercial product. The present invention provides a way of using orthosilicate esters while substantially mitigating the gel problems encountered by Clapsadle.

Heretofore in the antifreeze industry, there has been a long-felt need dating back several decades for a stable, gelation-resistant, silicate-containing antifreeze concentrate that does not require the use of stabilizers. The present invention teaches concentrates that exhibit attractive stabilities which are unexpected from a consideration of the prior art.

OBJECT OF THE INVENTION

It is an object of the invention to provide a corrosion-inhibitive heat transfer composition concentrate having improved stability at a pH of between about 6.0 and about 8.0.

This and other objects will become apparent from a reading of the following detailed specificaton.

SUMMARY OF THE INVENTION

The present invention encompasses a corrosion-inhibitive heat transfer composition concentrate comprising at least one glycol and at least one orthosilicate ester, said concentrate having a pH of between about 6.0 and about 8.0, and said concentrate containing an amount of orthosilicate ester sufficient to provide at least about 25 ppm of silicon in the concentrate.

DETAILED DESCRIPTION OF THE INVENTION

An aqueous corrosion-inhibitive heat transfer composition can be made from the composition concentrate by dilution of the concentrate with water at the use site. The composition concentrate itself can contain up to about 10 wt. % (preferably between about 2 and about 8 wt. %) water, based on the total weight of the concentrate. Although the composition concentrate of the present invention should generally contain a sufficient amount of orthosilicate ester to provide at least about 25 ppm silicon in the concentrate, it is preferred that the silicon be provided in an amount of from about 25 to about 4000 ppm (more preferably from about 50 to about 2000 ppm; most preferably from about 100 to about 800 ppm) silicon in the concentrate. When the orthosilicate ester provides less than about 25 ppm silicon it would be expected to be ineffective in its role as a corrosion inhibitor when diluted into the working anti-freeze. When the orthosilicate ester provides greater than 4000 ppms silicon, it would be expected to be too costly from an economic standpoint.

Numerous orthosilicate esters are useful within the scope of the present invention. They can be encompassed as a class by the formula:

wherein R is selected from the group consisting of alkyl, aryl and mixtures thereof. Useful orthosilicate esters would include alkyl silicates such as methyl silicate, ethyl silicate, butyl silicate and amylsilicates; aryl silicates such as benzyl and tolyl silicates; mixed alkyl silicates such as methyl ethyl silicate; mixed aryl silicates such as benzyl tolyl silicate; mixed alkyl aryl silicates such as methyl benzyl silicate and ethyl tolyl silicate; glycol silicates such as hydroxyethyl glycol silicate and hydroxy propyl glycol silicate; and polyhydroxy alcohol silicates such as glycerol silicate and pentaerythyitol silicate; and mixtures of the above.

Also useful within the scope of the present invention is the well-known class of partially condensed orthosilicate esters.

Optional additives can be employed in minor amounts of less than 50 wt. percent based on the weight of the composition concentrate. Typical optional additives would include, for example, known corrosion inhibitors for aluminum or other metals in admixture with the orthosilicate esters of the present invention such as, for example, alkali metal, amine or alkanolamine salts of silicates, borates, phosphates and benzoates, hydroxy benzoates, dicarboxylates or acids thereof, silicones, alkali metal nitrates, alkali metal nitrites, tolyltriazole, mercaptobenzothiazole, benzotriazole, and the like, or mixtures thereof. If one or more of the known inhibitors are employed together with the inhibitors of the present invention, the sum total of all inhibitors should be used in an "inhibitory effective amount", i.e., an amount sufficient to provide some corrosion inhibition with respect to the metal surfaces to be protected. Other typical optional additives would include wetting agents and surfactants such as, for example, known ionic and non-ionic surfactants such as the poly (oxyalkylene) adducts of fatty alcohols; antifoams and/or lubricants such as the well-known polysiloxanes and the polyoxyalkylene glycols, as well as any other minor ingredients known in the art that do not adversely affect the aluminum corrosion resistance sought to be achieved.

The composition concentrates of the present invention have been found to exhibit improved stability as compared to both analogous orthosilicate ester composition concentrates having pH's above the instant range and as compared to inorganic silicate compositions (without silicone stabilizers) within the instant pH range.

The following example is intended to be illustrative of, but to in no way limit, the present invention.

EXAMPLE 1

PART 1

In order to test the stability of a composition concentrate of the present invention within the pH range of the present invention, namely from about 6.0 to about 8.0, as compared to analogous composition concentrates having higher pH's, a test was conducted.

The tetraethylorthosilicate ("TES") test solutions were prepared in the following manner. The buffer concentrates (A to G) were prepared in accordance with the compositions given in Table 1. The concentrates were in turn diluted with ethylene glycol to achieve working reserve alkalinity levels (RA) of 50, 100, or 200, as specified in Table 2. For example, the buffer "B" composition concentrate having an RA of 200 was diluted with an equal weight of ethylene glycol to yield another buffer "B" concentrate having an RA of 100; and, a 3 times quantity of ethylene glycol, to yield another buffer "B" concentrate with an RA of 50 as shown in Table 2. To each of these buffer concentrates amounts of TES were added to yield final test solutions having 0.15 wt. % and 0.30 wt. % TES.

The stability tests were run by placing each test solution in a two-ounce, "French-square", glass bottle, appropriately labelled and stored at room temperature or placed in a constant temperature oven maintained at 100° F., 130° F. and 212° F. The stability test results, in terms of the number of days without visible gel formation are given in Table 2.

TABLE 1

| | BUFFER CONCENTRATES (in wt. % of each component) | | | | | | |
|---|---|---|---|---|---|---|---|
| Component | A | B Na₂B₄O₇ (200 RA*) | C Na₂B₄O₇/NaBO₂ (200 RA) | D NaBO₂ (200 RA) | E Na₂B₄O₇/K₂HPO₄ (100 RA) | F NaBO₂/K₂HPO₄ (100 RA) | G K₂HPO₄ (100 RA) |
| Ethylene Glycol | 100 | 92.152 | 93.569 | 93.924 | 93.248 | 93.363 | 89.765 |
| Na₂B₄O₇·5H₂O | — | 7.848 | 4.709 | 3.924 | 1.236 | 0.981 | — |
| NaOH-50 wt. % Aqueous | — | — | 1.722 | 2.152 | 0.398 | 0.538 | — |
| H₃PO₄-75% | — | — | — | — | 1.760 | 1.760 | 3.519 |
| KOH-45% | — | — | — | — | 3.358 | 3.358 | 6.716 |
| Total wt. % | 100 | 100 | 100 | 100 | 100 | 100 | 100 |

*RA denotes Reserve Alkalinity
Reserve alkalinity = ml N/10 HCl per 100 ml 33 vol % solution titrated to a pH of 5.5.

TABLE 2

| Buffer Concentrate | pH of Concentrate | aq. sol. of conc. | RA | DAYS STABILITY | | | | | | | |
|---|---|---|---|---|---|---|---|---|---|---|---|
| | | | | 0.15% TES | | | | 0.30% TES | | | |
| | | | | RT | 100 | 130 | 212 | RT | 100 | 130 | 212 |
| A | 6.0 | 7.0 | 0 | 120+ | 120+ | 120+ | 120+ | 120+ | 120+ | 120+ | 120+ |
| B | 6.0 | 7.9 | 50 | 120+ | 120+ | 120+ | 21 | 120+ | 120+ | 90 | 15 |
| | | | 100 | 120+ | 120+ | 120+ | 12 | 120+ | 120+ | 90 | 6 |
| | | | 200 | 120+ | 120+ | 90 | 6 | 120+ | 120+ | 15 | 6 |
| C | 6.6 | 8.5 | 50 | 120+ | 120+ | 120+ | 12 | 120+ | 120+ | 27 | 90 |
| | | | 100 | 120+ | 120+ | 120+ | 6 | 120+ | 120+ | 27 | 6 |
| | | | 200 | 120+ | 120+ | 27 | 6 | 120+ | 90 | 6 | 6 |
| D | 7.7 | 9.6 | 50 | 120+ | 120+ | 27 | 6 | 120+ | 27 | 15 | 3 |
| | | | 100 | 120+ | 120+ | 6 | 3 | 120+ | 15 | 6 | 3 |
| | | | 200 | 120+ | 27 | 6 | 3 | 27 | 15 | 6 | 3 |
| E | 8.4 | 8.7 | 50 | 90 | 21 | 21 | 21 | 27 | 21 | 21 | 12 |
| | | | 100 | 12 | 12 | 3 | 3 | 21 | 3 | 3 | 6 |
| F | 9.6 | 9.7 | 50 | 60 | 30 | 6 | 6 | 15 | 15 | 3 | 3 |
| | | | 100 | 21 | 21 | 21 | 3 | 21 | 24 | 21 | 3 |
| G | 10.0 | 9.7 | 50 | 90 | 21 | 6 | 6 | 27 | 15 | 6 | 3 |
| | | | 100 | 3 | 3 | 1 | 1 | 1 | 3 | 1 | 1 |

The above results show the clear superiority of TES concentrates of the present invention as compared to comparisons with concentrate pH's of 8.4 to 10.0.

EXAMPLE 1

PART 2

As a further comparison buffer concentrates A, C and E at a reserve alkalinities of 0; 100; 100, respectively, having a concentration of TES of 0.30 wt. % were stability tested at 150° F. versus an identical concentration but using potassium silicate. The results, as given in Table 3, which follows, shows the clear concentrate stability advantage of TES over potassium silicate at pH's of 6.0 and 6.6. At a pH above the range of the present invention, namely 8.4, the TES and potassium silicate concentrates provided equal stability.

TABLE 3

STORAGE STABILITY TEST OBSERVATIONS

| Buffer Concentrate | pH of Concentrate | RA | Days to Gelation | |
|---|---|---|---|---|
| | | | 0.30% TES* | 0.155 wt %* $K_2Si_2O_5$ |
| A | 6.0 | 0 | 120+ | 54 |
| C | 6.6 | 100 | 36 | 12 |
| E | 8.4 | 100 | 33 | 33 |

*Each contains 400 ppm Si.

We claim:

1. A corrosion-inhibitive heat transfer composition concentrate comprising at least one glycol and at least one orthosilicate ester, said concentrate having a pH of between about 6.0 and about 8.0, and said concentrate containing an amount of orthosilicate ester sufficient to provide at least about 25 ppm and not greater than 4000 ppm of silicon in the concentrate.

2. The composition concentrate of claim 1 which additionally contains a corrosion-inhibitive effective amount of at least one inorganic silicate.

3. The composition concentrate of claim 2 which consists essentially of glycol, at least one orthosilicate ester and at least one inorganic silicate.

4. The composition concentrate of claim 1 which consists essentially of glycol and at least one orthosilicate ester.

5. The composition concentrate of claim 1 wherein said orthosilicate ester is present in an amount sufficient to provide from about 100 to about 800 ppm of silicon in said concentrate.

6. The composition concentrate of any of claims 1 through 5 wherein said orthosilicate ester is tetramethylorthosilicate or tetraethylorthosilicate, or mixtures thereof.

7. The composition concentrate of any of claims 1 through 5 which additionally contains an alkali metal or alkanolamine salt of borate, or mixtures thereof, in an amount of less than 50 wt. % based on the weight of the concentrate.

8. The composition concentrate of any of claims 1 through 5 which additionally contains at least one amine or alkanolamine phosphate, in an amount of less than 50 wt. % based on the weight of the concentrate.

9. The composition concentrate of any of claims 1 through 5 which additionally contains a borate/phosphate mixture selected from the group consisting of alkali metal, amine, or alkanolamine salts of borate or phosphate or mixtures thereof.

10. The composition concentrate of any of claims 1 through 5 which additionally contains at least one alkali metal, amine or alkanolamine salt of benzoate, hydroxy benzoate, dicarboxylate, or acids thereof, or mixtures thereof.

11. The composition concentrate of any of claims 1 through 5 wherein said pH is between about 6.0 and 6.6.

* * * * *